H. E. GOUGE.
ELECTRIC STEERING SYSTEM.
APPLICATION FILED AUG. 6, 1920.
1,376,271.
Patented Apr. 26, 1921.
3 SHEETS—SHEET 1.
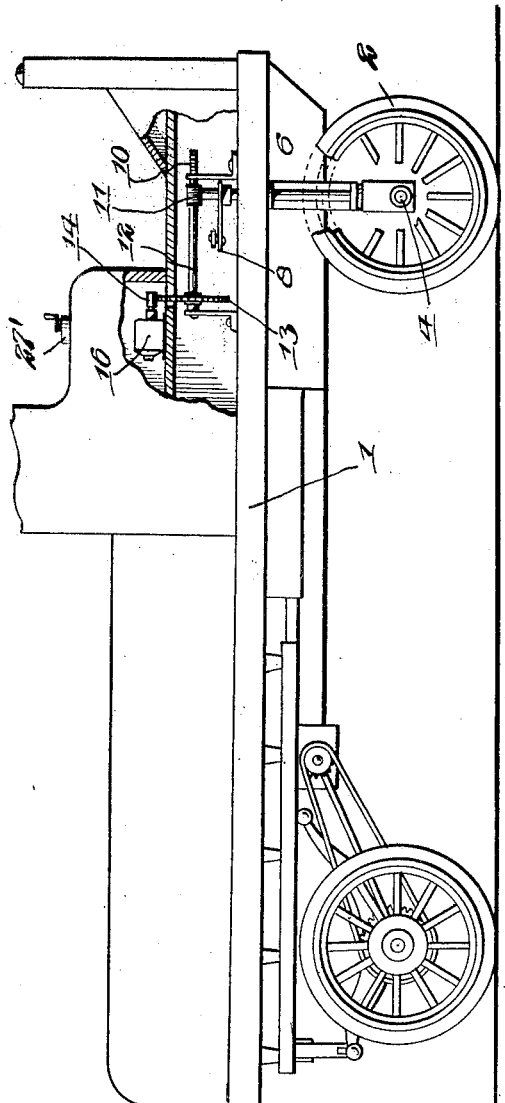
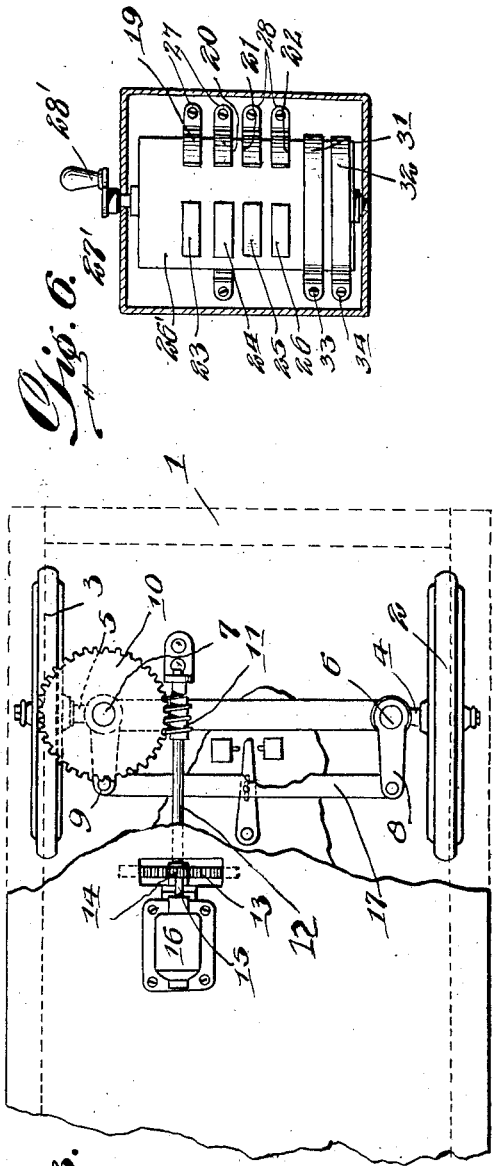

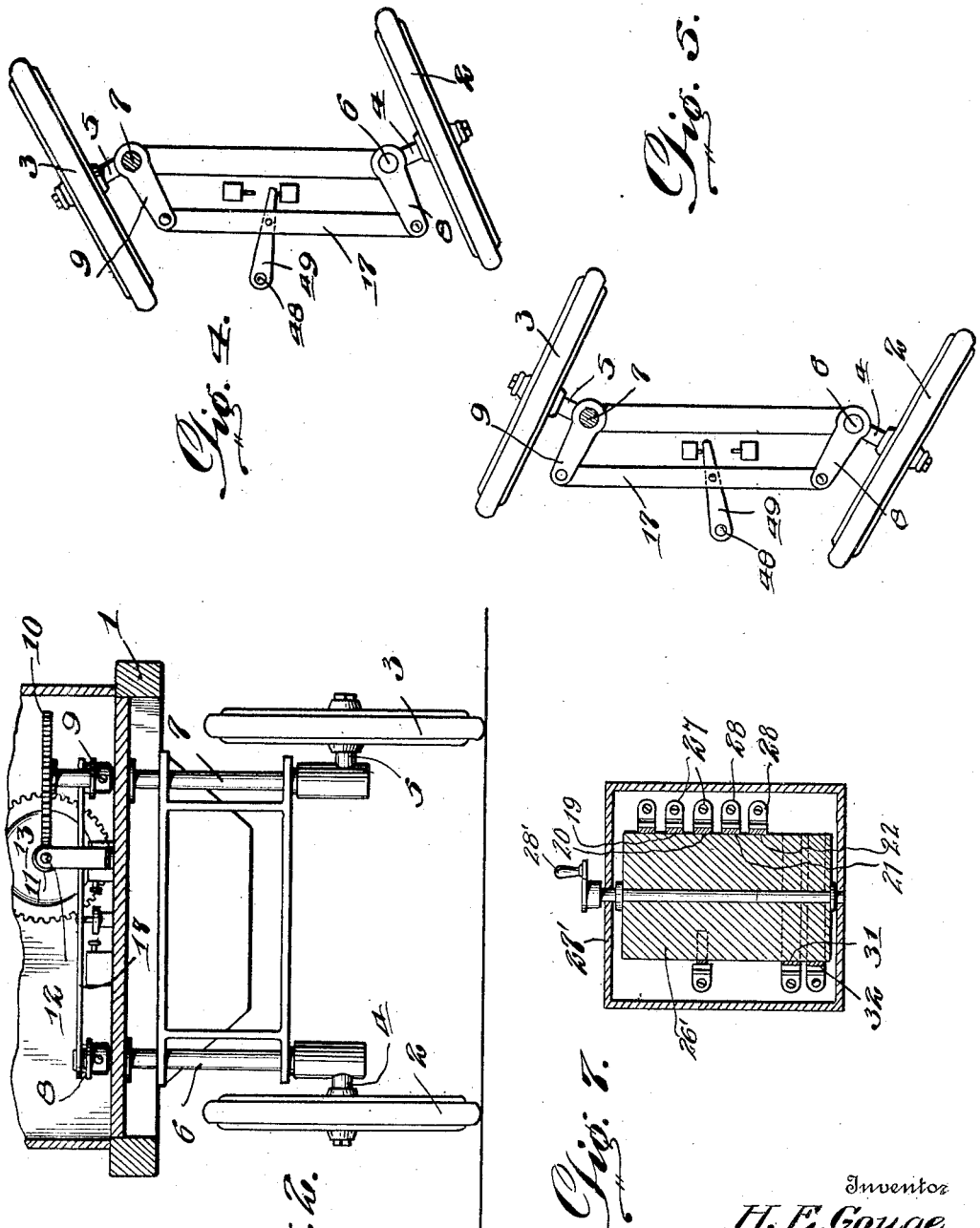

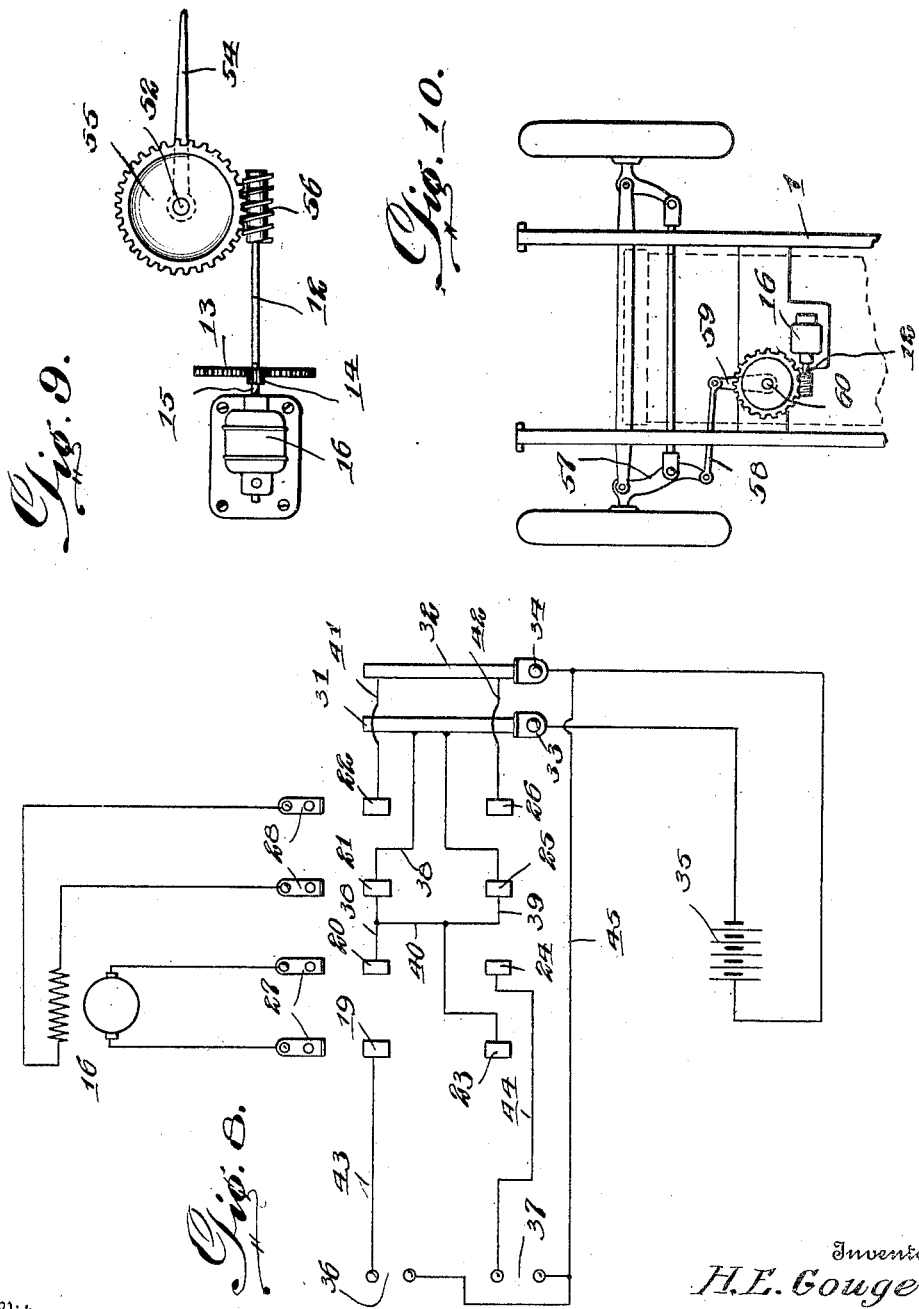

UNITED STATES PATENT OFFICE.

HORACE EZEKIEL GOUGE, OF BRISTOL, TENNESSEE.

ELECTRIC STEERING SYSTEM.

1,376,271. Specification of Letters Patent. Patented Apr. 26, 1921.

Application filed August 6, 1920. Serial No. 402,029.

*To all whom it may concern:*

Be it known that I, HORACE E. GOUGE, a citizen of the United States, residing at Bristol, in the county of Sullivan and State of Tennessee, have invented new and useful Improvements in Electric Steering Systems, of which the following is a specification.

This invention relates to improvements in steering mechanism for motor vehicles, and has particular application to an electric steering mechanism.

In carrying out the present invention, it is my purpose to provide an electric steering mechanism for motor vehicles which will embody a reversible motor connected with the steering wheel of the vehicle and under the control of a hand controller located within convenient reach of the driver of the vehicle and automatic circuit breakers operable to break the circuit through the motor automatically in the event of the steering wheel being turned at too great an angle, thereby reducing the possibility of accident due to carelessness or forgetfulness.

In the accompanying drawings:—

Figure 1 is a view in side elevation of a vehicle equipped with steering mechanism constructed in accordance with the present invention.

Fig. 2 is a front elevation of the same.

Fig. 3 is a top plan view, parts being broken away.

Figs. 4 and 5 are diagrammatic views, showing the steering wheels in their extreme positions.

Fig. 6 is a vertical sectional view through the controller, the drum and contacts being shown in front elevation.

Fig. 7 is a sectional view through the controller, drum and contact.

Fig. 8 is a diagrammatic view showing the circuit connection.

Fig. 9 is a plan view showing the invention as applied to the rudder of a vessel.

Fig. 10 is a plan view showing the motor connected to the steering wheels of a motor vehicle equipped with the usual operating mechanism.

Referring now to the drawings in detail, and more particularly to the construction shown in Figs. 1 to 8 inclusive, 1 designates the frame of a motor vehicle. In the present instance the forward end of the motor vehicle is equipped with depending vertical shafts 6 and 7, respectively, arranged upon opposite sides of the center of the vehicle, and connected to the lower ends of the shafts 6 and 7 and projecting outwardly therefrom at right angles thereto are spindles 4 and 5, respectively, upon which are mounted the steering wheels 2 and 3 of the vehicle. These shafts 6 and 7 are capable of rotary movement in order to effect the steering of the vehicle, and secured to the upper end of the shaft 6 is an arm 8, while connected to the shaft 7 below the upper extremity thereof is an arm 9 connected to the arm 8 through the medium of a connecting rod 17, so that motion may be permitted from one shaft to the other. Fixed upon the upper end of the shaft 7 above the arm 9 is a worm gear 10 meshing with a worm 11 fixed upon one end of a horizontal shaft 12 journaled in horizontally alined bearings and having the other end equipped with a spur gear 13 meshing with a pinion 14 carried upon the armature shaft 15 of a reversible motor 16. By means of this construction, it will be seen that when the motor is operated in one direction motion will be permitted through the shaft 12 and worm to the worm gear 10, thereby rotating the shaft 7 and the shaft 6 connected to the shaft 7 to turn the steering wheels 2 and 3 in one direction while when the motor is turned in the other direction, the steering wheels will be likewise effected.

Mounted upon the motor shank and disposed within convenient reach of the driver is a controller 27' embodying a vertical casing in which is rotatably mounted a rotatable drum 26' having the upper end of the shaft thereof projecting through the top wall of the casing and equipped with a handle 28', whereby the drum may be rotated in one direction or the other. Surrounding the drum 26' adjacent to the lower end thereof and arranged one above the other are current collecting rings 31 and 32, and bearing upon the rings 31 and 32 are brushes 33 and 34, respectively, connected to the respective terminals of a source of electrical energy, such, for instance, as a battery 35. Suitably secured to the drum above the current collecting rings 31 and 32 and arranged in a row are contact segments 19, 20, 21 and 22, and arranged alongside of the said contact segments and spaced apart therefrom, are similar segments 23, 24, 25 and 26, and secured to the casing of the controller and adapted to engage the respective segments 19 and 20, when the drum is turned in one direction and the segments 23 and 24 when the drum is turned in the other direction, are brushes 27. Also secured within the casing are brushes 28 adapted to be engaged by the respective segments 21 and 22 when the drum is turned in one direction and the segments 25 and 26 when the drum is turned in the other direction.

The brushes 27 are connected to the armature terminals of the motor while the brushes 28 are connected to the field terminals, as clearly illustrated in Fig. 8 of the drawings.

Suitably secured to the body of the vehicle below the connecting rod 17 are circuit breakers 36 and 37 arranged at opposite sides of one end of a lever 49 and pivoted at its other end, as at 48, and having the central portion thereof connected to the rod 17. These circuit breakers are disposed in positions corresponding to the extreme movements of the steering wheels of the vehicle, so that when said wheels are in either of their extreme positions, the lever 49 will engage the corresponding circuit breaker to open the circuit controller by such breaker.

The current collecting ring 31 is connected to the contact segments 21 and 20 by means of a conductor 38, and is connected to the contact segments 25 and 23 by means of a conductor 39, and connecting the conductors 38 and 39 at a point between the contacts 20 and 21 and the contacts 23 and 25 is a branch conductor 40. The current collecting ring 32 is connected to the contact segment 22 by means of a conductor 41 and to the contact segment 26 by means of a conductor 42. Leading from the contact segment 19 is a conductor 43 terminally connected to one side of the circuit breaker 36, while leading from the segment 24 is a conductor 44 terminally connected to one side of the circuit breaker 37. The other sides of the circuit breakers 36 and 37 are connected to the side of the battery 35 opposite from that connected to the brush 33 by means of a conductor 45.

In practice, when it is desired to turn the steering wheels of the vehicle in one direction, the controller drum 26' is rotated to engage the segments 19 and 20 and 21 and 22 with the brushes 27 and 28, respectively. When these connections are made current flows from one side of the battery 35 through the ring 31, the contact segment 21, the field of the motor, the contact segment 22 and then back to the other side of the battery by way of the ring 32 and brush 34. Current also flows through the segment 20, the armature of the motor, the segment 19, the conductor 43, the circuit breaker 36, and the conductor 45 back to the other side of the battery. Thus the motor is energized to turn the steering wheel in one direction, and should the steering wheel reach a dangerous angle, the lever 49 will operate the circuit breaker 36 to break the circuit through the armature, thereby deënergizing the motor. On the other hand, when it is desired to turn the steering wheels in the reverse direction, the controller drum is rotated to engage the segments 23 and 24 with the brushes 27, and the segments 25 and 26 with the brushes 28, and in this position of the controller drum the current flows through the field in the same direction as before and through the armature in the reverse direction, thereby reversing the operation of the motor, so that the steering wheels may be operated, current flowing from one side of the battery 35 through the ring 31, the segment 25, brush 28, the field of the motor, the other brush 28, the segment 26 and then back to the other side of the battery. This current also flows through the segment 23 by way of the conductor 39, the brush 27, the motor armature, the other brush, the segment 24, conductor 44, the circuit breaker 37, and back to the battery by way of the conductor 45.

In Fig. 9 of the drawings, I have shown a ship's rudder 5, having the upper end of the shaft 52 thereof equipped with a worm gear 55 meshing with a worm 56 on the end of the shaft 12, and in Fig. 10, I have shown the arm 57 of the steering knuckles of a motor vehicle connected through the medium of a link 58 with an arm 59 fixed to a shaft 60 that is equipped with a worm wheel meshing with the worm on the shaft 12.

While I have herein shown and described the preferred form of my invention by way of illustration, I wish it to be understood that I do not limit myself to the precise details of construction herein described and delineated as modifications and variations may be made within the scope of the claim and without departing from the spirit of the invention.

Having described my invention, what I claim and desire to secure by Letters-Patent, is:—

An electric steering apparatus for motor vehicles, comprising the combination with the steering wheels, of vertical shafts carrying said wheels, means interconnecting said wheels for simultaneous movement, a motor having a gear connection with one of said shafts, a source of current, a control switch in circuit with said source of current and said motor, a shaft connected with said switch and with said wheel interconnecting means whereby said switch may be automatically moved to break said circuit upon said wheels being turned to a dangerous angle.

In testimony whereof I affix my signature.

HORACE EZEKIEL GOUGE.